United States Patent
Naoi et al.

(10) Patent No.: US 11,244,701 B2
(45) Date of Patent: Feb. 8, 2022

(54) HEXAGONAL STRONTIUM FERRITE POWDER FOR MAGNETIC RECORDING AND MAGNETIC RECORDING MEDIUM

(71) Applicant: FUJIFILM Corporation, Tokyo (JP)

(72) Inventors: Kenji Naoi, Minami-ashigara (JP); Masashi Shirata, Minami-ashigara (JP)

(73) Assignee: FUJIFILM Cornoration, Tokyo (JP)

( * ) Notice: Subject to any disclaimer, the term of this patent is extended or adjusted under 35 U.S.C. 154(b) by 758 days.

(21) Appl. No.: 16/008,147

(22) Filed: Jun. 14, 2018

(65) Prior Publication Data

US 2018/0366152 A1 Dec. 20, 2018

(30) Foreign Application Priority Data

Jun. 14, 2017 (JP) .............................. JP2017-116499

(51) Int. Cl.
*G11B 5/706* (2006.01)
*G11B 5/714* (2006.01)
*C01G 49/00* (2006.01)
*G11B 5/708* (2006.01)

(52) U.S. Cl.
CPC ...... *G11B 5/70678* (2013.01); *C01G 49/0018* (2013.01); *C01G 49/0054* (2013.01); *G11B 5/714* (2013.01); *C01P 2006/42* (2013.01); *C01P 2006/90* (2013.01); *G11B 5/7085* (2013.01)

(58) Field of Classification Search
CPC ... G11B 5/70678; G11B 5/7085; G11B 5/714; C01G 49/0018; C01G 49/0036; C01G 49/0054; C01P 2002/54; C01P 2006/42; C01P 2006/90
See application file for complete search history.

(56) References Cited

U.S. PATENT DOCUMENTS

| 2012/0080638 A1 | 4/2012 | Hattori |
| 2013/0256584 A1 | 10/2013 | Yamazaki et al. |
| 2016/0141084 A1 | 5/2016 | Shirata |

FOREIGN PATENT DOCUMENTS

| JP | 2003-059032 A | 2/2003 |
| JP | 2010-100489 A | 5/2010 |
| JP | 2011-178654 A | 9/2011 |
| JP | 2013-211316 A | 10/2013 |
| WO | 2014/208731 A1 | 12/2014 |

OTHER PUBLICATIONS

English machine translation of JP 2003-059032, Feb. 2003.*
Office Action dated May 19, 2020 from the Japanese Patent Office in JP Application No. 2017-116499.
Office Action dated Nov. 20, 2020 in Chinese Application No. 201810611324.7.
Barthem et al., "An approach to coercivity relating coercive field and activation volume", Physica B, 2002, vol. 319, pp. 127-132 (6 pages total).
Kim et al., "Magnetic Field Dependence of the Activation Volume for Sr-ferrite Particles", Journal of the Korean Magnetics Society, 2016, vol. 26, No. 6, pp. 196-200 (5 pages total).
Ding et al., "Magnetic properties of Ba- and Sr-hexaferrite prepared by mechanical alloying", Journal of Magnetism and Magnetic Materials, 1996, vol. 164, pp. 385-389 (5 pages total).

* cited by examiner

*Primary Examiner* — Holly Rickman
(74) *Attorney, Agent, or Firm* — Sughrue Mion, PLLC

(57) ABSTRACT

Provided is hexagonal strontium ferrite powder for magnetic recording, in which an activation volume is 800 to 1,500 $nm^3$, a content of rare earth atom with respect to 100 atom % of iron atom is 0.5 to 5.0 atom %, and a rare earth atom surface portion uneven distribution is provided.

22 Claims, No Drawings

HEXAGONAL STRONTIUM FERRITE POWDER FOR MAGNETIC RECORDING AND MAGNETIC RECORDING MEDIUM

CROSS-REFERENCE TO RELATED APPLICATIONS

This application claims priority under 35 U.S.C 119 to Japanese Patent Application No. 2017-116499 filed on Jun. 14, 2017. The above application is hereby expressly incorporated by reference, in its entirety, into the present application.

BACKGROUND OF THE INVENTION

1. Field of the Invention

The present invention relates to hexagonal strontium ferrite powder for magnetic recording and a magnetic recording medium.

2. Description of the Related Art

In recent years, in the magnetic recording field, recording with higher density has proceeded and, along with this, a decrease in particle size of ferromagnetic powder (hereinafter, referred to as "atomization") is required (for example, see paragraph 0004 of JP2011-178654A).

SUMMARY OF THE INVENTION

A magnetic recording medium is useful as a recording medium for data storage used for repeatedly reproducing recorded information. Recently, as ferromagnetic powder included in the magnetic recording medium, hexagonal ferrite powder is widely used. For example, JP2011-178654A discloses powder including barium as an alkali earth metal atom, that is, hexagonal barium ferrite powder, as the hexagonal ferrite powder (see paragraph 0028 and the like of JP2011-178654A). Meanwhile, hexagonal strontium ferrite powder including a strontium atom as an alkali earth metal atom is also known as the hexagonal ferrite powder. In general, it is thought that the hexagonal strontium ferrite powder is ferromagnetic powder useful for increasing reproducing output in a case of reproducing information recorded on a magnetic recording medium, compared to the hexagonal barium ferrite powder. The reason thereof is a tendency of high mass magnetization σs of the hexagonal strontium ferrite powder, compared to that of the hexagonal barium ferrite powder.

Therefore, the inventors made studies regarding atomization of the hexagonal strontium ferrite powder which is considered to be useful for increasing reproducing output. However, as a result of the studies, it is clear that, in a magnetic recording medium including the hexagonal strontium ferrite powder, a decrease in reproducing output during repeated reproducing is significant, along with atomization of the hexagonal strontium ferrite powder.

An object of the invention is to satisfy both atomization of the hexagonal strontium ferrite powder and prevention of a decrease in reproducing output during repeated reproducing.

According to an aspect of the invention, there is provided hexagonal strontium ferrite powder for magnetic recording (hereinafter, also simply referred to as "hexagonal strontium ferrite powder"), in which an activation volume is 800 to 1,500 $nm^3$, a content of rare earth atom with respect to 100 atom % of iron atom is 0.5 to 5.0 atom %, and a rare earth atom surface portion uneven distribution is provided.

In the invention and the specification, the "powder" means an aggregate of a plurality of particle. For example, the hexagonal strontium ferrite powder means an aggregate of a plurality of hexagonal strontium ferrite particles. In addition, the aggregate of the plurality of particles not only includes an aspect in which particles configuring the aggregate are directly in contact with each other, but also includes an aspect in which a binding agent, an additive, or the like which will be described later is sandwiched between the particles.

The "activation volume" is a unit of magnetization reversal and an index showing a magnetic magnitude of the particles. Regarding the activation volume and an anisotropy constant Ku which will be described later disclosed in the invention and the specification, magnetic field sweep rates of a coercivity Hc measurement part at time points of 3 minutes and 30 minutes are measured by using an oscillation sample type magnetic-flux meter (measurement temperature: 23° C.±1° C.), and the activation volume and the anisotropy constant Ku are values acquired from the following relational expression of Hc and an activation volume V. A unit of the anisotropy constant Ku is 1 erg/cc=1.0×10⁻¹ $J/m^3$.

$$Hc=2Ku/Ms\{1-[(kT/KuV)\ln(At/0.693)]^{1/2}\}$$

[In the expression, Ku: anisotropy constant (unit: $J/m^3$), Ms: saturation magnetization (unit: kA/m), k: Boltzmann's constant, T: absolute temperature (unit: K), V: activation volume (unit: $cm^3$), A: spin precession frequency (unit: $s^{-1}$), and t: magnetic field reversal time (unit: s)]

The "rare earth atom" of the invention and the specification is selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), an europium atom (Eu), a gadolinium atom (Gd), a terbium atom (Th), a dysprosium atom (Dy), a holmium atom (Ho), an erbium atom (Er), a thulium atom (Tm), an ytterbium atom (Yb), and a lutetium atom (Lu).

The "rare earth atom surface portion uneven distribution" of the invention and the specification means that a rare earth atom content with respect to 100 atom % of iron atom in a solution obtained by partially dissolving the hexagonal strontium ferrite powder with acid (hereinafter, referred to as a "surface portion content") and a rare earth atom content with respect to 100 atom % of iron atom in a solution obtained by totally dissolving the hexagonal strontium ferrite powder with acid (hereinafter, referred to as a "bulk content") satisfy a ratio of "surface portion content/bulk content>1.0". The rare earth atom content of the hexagonal strontium ferrite powder is identical to the bulk content. With respect to this, the partial dissolving using acid is to dissolve the surface portion of particles configuring the hexagonal strontium ferrite powder, and accordingly, the rare earth atom content in the solution obtained by the partial dissolving is the rare earth atom content in the surface portion of the particles configuring the hexagonal strontium ferrite powder. The surface portion content satisfying a ratio of "surface portion content/bulk content>1.0" means that the rare earth atoms are unevenly distributed in the surface portion (that is, a larger amount of the rare earth atoms is present, compared to that inside), in the particles configuring the hexagonal strontium ferrite powder. The surface portion of the specification and the specification means a part of the region of the particles configuring the hexagonal strontium ferrite powder from the inside from the surface.

Regarding the hexagonal strontium ferrite powder present as the powder, sample powder for the partial dissolving and the total dissolving are collected from powder of the same batch. Meanwhile, regarding the hexagonal strontium ferrite powder included in a magnetic layer of a magnetic recording medium, a part of the hexagonal strontium ferrite powder extracted from the magnetic layer is subjected to the partial dissolving and the other part is subjected to the total dissolving. The extraction of the hexagonal strontium ferrite powder from the magnetic layer can be performed by a method disclosed in a paragraph 0032 of JP2015-91747A.

The partial dissolving means dissolving performed so that the hexagonal strontium ferrite powder remaining in the solution can be visually confirmed at the time of the completion of the dissolving. For example, by performing the partial dissolving, a region of the particles configuring the hexagonal strontium ferrite powder which is 10% to 20% by mass with respect to 100% by mass of a total of the particles can be dissolved. On the other hand, the total dissolving means dissolving performed until the hexagonal strontium ferrite powder remaining in the solution is not visually confirmed at the time of the completion of the dissolving.

The partial dissolving and the measurement of the surface portion content are, for example, performed by the following method. However, dissolving conditions such as the amount of sample powder and the like described below are merely examples, and dissolving conditions capable of performing the partial dissolving and the total dissolving can be randomly used.

A vessel (for example, beaker) containing 12 mg of sample powder and 10 ml of hydrochloric acid having a concentration of 1 mol/L is held on a hot plate at a set temperature of 70° C. for 1 hour. The obtained solution is filtered with a membrane filter having a hole diameter of 0.1 μm. The element analysis of the solution obtained as described above is performed by an inductively coupled plasma (ICP) analysis device. By doing so, the surface portion content of the rare earth atom with respect to 100 atom % of the iron atom can be obtained. In a case where a plurality of kinds of rare earth atoms are detected from the element analysis, a total content of the entirety of the rare earth atoms is the surface portion content. The same applies to the measurement of the bulk content.

Meanwhile, the total dissolving and the measurement of the bulk content are, for example, performed by the following method.

A vessel (for example, beaker) containing 12 mg of sample powder and 10 ml of hydrochloric acid having a concentration of 4 mol/L is held on a hot plate at a set temperature of 80° C. for 3 hours. After that, the process is performed in the same manner as in the partial dissolving and the measurement of the surface portion content, and the bulk content with respect to 100 atom % of the iron atom can be obtained.

In one aspect, the rare earth atom may be one or more kinds of rare earth atom selected from the group consisting of a neodymium atom, a samarium atom, an yttrium atom, and a dysprosium atom.

In one aspect, the activation volume may be 800 to 1,100 $nm^3$.

In one aspect, an anisotropy constant Ku of the hexagonal strontium ferrite powder may be equal to or greater than $2.0 \times 10^6$ erg/cc.

In one aspect, a mass magnetization σs of the hexagonal strontium ferrite powder may be equal to or greater than 45 $A \cdot m^2/kg$.

According to another aspect of the invention, there is provided a magnetic recording medium comprising: a non-magnetic support; and a magnetic layer including ferromagnetic powder and a binding agent on the non-magnetic support, in which the ferromagnetic powder is the hexagonal strontium ferrite powder according to one aspect of the invention.

According to one aspect of the invention, it is possible to provide a magnetic recording medium including atomized hexagonal strontium ferrite powder having an activation volume of 800 to 1,500 $nm^3$ as ferromagnetic powder of a magnetic layer, in which a decrease in reproducing output during repeated reproducing is prevented, and hexagonal strontium ferrite powder for magnetic recording, capable of manufacturing such a magnetic recording medium.

DESCRIPTION OF THE PREFERRED EMBODIMENTS

Hexagonal Strontium Ferrite Powder for Magnetic Recording

One aspect of the invention relates to hexagonal strontium ferrite powder for magnetic recording, in which an activation volume is 800 to 1,500 $nm^3$, a content of rare earth atom with respect to 100 atom % of iron atom is 0.5 to 5.0 atom %, and a rare earth atom surface portion uneven distribution is provided.

The hexagonal strontium ferrite powder is ferromagnetic powder for magnetic recording and can be used for forming a magnetic layer of a coating type magnetic recording medium, for example.

Hereinafter, the hexagonal strontium ferrite powder will be described more specifically. The following description includes a surmise of the inventors. The invention is not limited to such a surmise.

Activation Volume

The activation volume of the hexagonal strontium ferrite powder is 800 to 1,500 $nm^3$. The atomized hexagonal strontium ferrite powder showing the activation volume in the range described above is suitable for manufacturing a magnetic recording medium exhibiting excellent electromagnetic conversion characteristics. The activation volume of the hexagonal strontium ferrite powder is equal to or greater than 800 $nm^3$ and can also be, for example equal to or greater than 850 $nm^3$. In addition, from a viewpoint of further improving electromagnetic conversion characteristics, the activation volume of the hexagonal strontium ferrite powder is preferably equal to or smaller than 1,400 $nm^3$, more preferably equal to or smaller than 1,300 $nm^3$, even more preferably equal to or smaller than 1,200 $nm^3$, and still more preferably equal to or smaller than 1,100 $nm^3$.

Presence State of Rare Earth Atom

The hexagonal strontium ferrite powder includes a rare earth atom having a content (bulk content) of 0.5 to 5.0 atom % with respect to 100 atom % of an iron atom. The inventors have thought that the rare earth atom having the bulk content in the range described above and uneven distribution of the rare earth atom in the surface portion of the particles configuring the hexagonal strontium ferrite powder contribute to prevention of a decrease in reproducing output during repeated reproducing. This is surmised that it is because the anisotropy constant Ku can be increased due to the rare earth atom having the bulk content in the range described above included in the hexagonal strontium ferrite powder and the uneven distribution of the rare earth atom in the surface portion of the particles configuring the hexagonal strontium ferrite powder. As the value of the anisotropy constant Ku is high, occurrence of a phenomenon which is so-called thermal fluctuation can be prevented (that is, thermal stability can be improved). By preventing occurrence of thermal fluctuation, a decrease in reproducing output during repeated reproducing can be prevented. The inventors have surmised that, the uneven distribution of the rare earth atom in the surface portion of the particles of the hexagonal strontium ferrite powder may contribute to stabilization of a spin at an iron (Fe) site in a crystal lattice of the surface portion, thereby increasing the anisotropy constant Ku.

In addition, it is determined that, by using the hexagonal strontium ferrite powder as ferromagnetic powder of the magnetic layer, chipping of the surface of the magnetic layer due to sliding with a magnetic head can be prevented, as an unexpected phenomenon. That is, it is determined that the hexagonal strontium ferrite powder also contributes to improvement of running durability of a magnetic recording medium. The inventors have surmised that, this is because the uneven distribution of the rare earth atom in the surface of the particles configuring the hexagonal strontium ferrite powder contributes to an interaction between the surface of the particles and an organic substance (for example, binding agent and/or additive) included in the magnetic layer, thereby improving hardness of the magnetic layer.

From a viewpoint of further preventing a decrease in reproducing output during repeated running and/or a viewpoint of further improving running durability, the bulk content is preferably 0.5 to 4.5 atom %, more preferably 1.0 to 4.5 atom %, and even more preferably 1.5 to 4.5 atom %.

The bulk content is a content obtained by totally dissolving the hexagonal strontium ferrite powder. In the invention and the specification, the content of the atom is a bulk content obtained by totally dissolving the hexagonal strontium ferrite powder, unless otherwise noted. The hexagonal strontium ferrite powder may include only one kind of rare earth atom or may include two or more kinds of rare earth atom, as the rare earth atom. In a case where two or more kinds of rare earth atom are included, the bulk content is obtained from the total of the two or more kinds of rare earth atom. The same also applies to the other components of the invention and the specification. That is, for a given component, only one kind may be used or two or more kinds may be used, unless otherwise noted. In a case where two or more kinds are used, the content is a content of the total of the two or more kinds.

The rare earth atom included in the hexagonal strontium ferrite powder may be any one or more kinds of the rare earth atom. Examples of the rare earth atom preferable from a viewpoint of further preventing a decrease in reproducing output during repeated reproducing include a neodymium atom, a samarium atom, an yttrium atom, and a dysprosium atom, a neodymium atom, a samarium atom, an yttrium atom are more preferable, and a neodymium atom is even more preferable.

The hexagonal strontium ferrite powder includes one or more kinds of the rare earth atom having the bulk content in the range described above, and the rare earth atom included therein is unevenly distributed in the surface portion of the particles configuring the hexagonal strontium ferrite powder. The inventors have thought that this contributes to prevention of a decrease in reproducing output during repeated reproducing in a magnetic recording medium including the hexagonal strontium ferrite powder in a magnetic layer. The details of the surmise of the inventors regarding this point is as described above. A degree of uneven distribution of the rare earth atom is not limited, as long as the rare earth atom is unevenly distributed in the surface portion of the particles configuring the hexagonal strontium ferrite powder. For example, regarding the hexagonal strontium ferrite powder, a ratio of the surface portion content of the rare earth atom obtained by partial dissolving performed under the dissolving conditions exemplified above and the bulk content of the rare earth atom obtained by total dissolving performed under the dissolving conditions exemplified above, "surface portion content/bulk content" is greater than 1.0 and can be equal to or greater than 1.5. In addition, the ratio of the surface portion content of the rare earth atom obtained by partial dissolving performed under the dissolving conditions exemplified above and the bulk content of the rare earth atom obtained by total dissolving performed under the dissolving conditions exemplified above, "surface portion content/bulk content" can be, for example, equal to or smaller than 10.0, equal to or smaller than 9.0, equal to or smaller than 8.0, equal to or smaller than 7.0, equal to or smaller than 6.0, equal to or smaller than 5.0, or equal to or smaller than 4.0. However, as described above, the "surface portion content/bulk content" is not limited to the exemplified upper limit or the lower limit, as long as the rare earth atom is unevenly distributed in the surface portion of the particles configuring the hexagonal strontium ferrite powder.

Constituting Atoms of Hexagonal Strontium Ferrite Powder

A crystal structure of hexagonal ferrite includes at least an iron atom, a divalent metal atom, and an oxygen atom as constituting atoms. A divalent metal atom is a metal atom which can be divalent cations as ions, and examples thereof include an alkali earth metal atom such as a strontium atom, a barium atom, or a calcium atom, and a lead atom. However, the divalent metal atom disclosed in the invention and the specification does not include rare earth atom. Hexagonal ferrite including a strontium atom as the divalent metal atom is strontium ferrite. In the invention and the specification, the hexagonal strontium ferrite powder is powder in which main divalent metal atom included in this powder is a strontium atom. The main divalent metal atom is a divalent metal atom occupying the greatest content in the divalent metal atom included in the hexagonal strontium ferrite powder based on atom %. A content of the strontium atom in the hexagonal strontium ferrite powder can be, for example, 2.0 to 15.0 atom % with respect to 100 atom % of the iron atom. In one aspect, in the hexagonal strontium ferrite powder, the divalent metal atom included in this powder can be only a strontium atom. In another aspect, the hexagonal strontium ferrite powder can also include one or more kinds of other divalent metal atoms, in addition to the strontium atom. For example, a barium atom and/or a calcium atom can be included. In a case where the divalent metal atom other than the strontium atom is included, a content of a barium atom and a content of a calcium atom in the hexagonal strontium ferrite powder respectively can be, for example, 0.05 to 5.0 atom % with respect to 100 atom % of the iron atom.

As the crystal structure of the hexagonal ferrite, a magnetoplumbite type (also referred to as an "M type"), a W type, a Y type, and a Z type are known. The hexagonal strontium ferrite powder may have any crystal structure. The crystal structure can be confirmed by X-ray diffraction analysis. In the hexagonal strontium ferrite powder, a single crystal structure or two or more kinds of crystal structure can be detected by the X-ray diffraction analysis. For example, in one aspect, in the hexagonal strontium ferrite powder, only the M type crystal structure can be detected by the X-ray diffraction analysis. For example, the M type hexagonal ferrite is represented by a compositional formula of $AFe_{12}O_{19}$. Here, A represents a divalent metal atom, in a case where the hexagonal strontium ferrite powder has the M type, A is only a strontium atom (Sr), or in a case where a plurality of divalent metal atoms are included as A, the strontium atom (Sr) occupies the hexagonal strontium ferrite powder with the greatest content based on atom % as described above. A content of the divalent metal atom in the hexagonal strontium ferrite powder is generally determined according to the type of the crystal structure of the hexagonal ferrite and is not particularly limited. The same applies to a content of an iron atom and a content of an oxygen atom. The hexagonal strontium ferrite powder at least includes an iron atom, a strontium atom, an oxygen atom, and a rare earth atom, and may or may not include atoms other than these atoms. As an example, the hexagonal strontium ferrite powder may include an aluminum atom (Al). A content of the aluminum atom can be, for example, 0.5 to 10.0 atom % with respect to 100 atom % of the iron atom. From a viewpoint of further preventing a decrease in reproducing output during repeated reproducing, the hexagonal strontium ferrite powder includes the iron atom, the strontium atom, the oxygen atom, and the rare earth atom, and a content of the atoms other than these atoms is preferably equal to or smaller than 10.0 atom %, more preferably 0 to 5.0 atom %, and may be 0 atom % with respect to 100 atom % of the iron atom. That is, in one aspect, the hexagonal strontium ferrite powder may not include atoms other than the iron atom, the strontium atom, the oxygen atom, and the rare earth atom. The content shown with atom % described above is obtained by converting the content (unit: % by mass) of each atom obtained by totally dissolving the hexagonal strontium ferrite powder by using the atomic weight. In addition, in the invention and the specification, a given atom which is "not included" means that the content thereof obtained by performing total dissolving and measurement by using an ICP analysis device is 0% by mass. A detection limit of the ICP analysis device is generally equal to or smaller than 0.01 ppm (parts per million) based on mass. The expression "not included" is used as a meaning including that a given atom is included with the amount smaller than the detection limit of the ICP analysis device. In one aspect, the hexagonal strontium ferrite powder does not include a bismuth atom (Bi).

Anisotropy Constant Ku

The anisotropy constant Ku can be used as an index of reduction of thermal fluctuation, that is, improvement of thermal stability. The hexagonal strontium ferrite powder can preferably have Ku equal to or greater than $1.5 \times 10^4$ $J/m^3$, and more preferably have Ku equal to or greater than $1.7 \times 10^4$ $J/m^3$. In addition, Ku of the hexagonal strontium ferrite powder can be, for example, equal to or smaller than $1.8 \times 10^4$ $J/m^3$. However, the high Ku is preferable, because it means high thermal stability, and thus, Ku is not limited to the exemplified value.

Mass Magnetization σs

From a viewpoint of increasing reproducing output in a case of reproducing information recorded on a magnetic recording medium, it is desirable that the mass magnetization σs of ferromagnetic powder included in the magnetic recording medium is high. In regards to this point, according to the studies of the inventors, in hexagonal strontium ferrite powder which includes the rare earth atom but does not have the rare earth atom surface portion uneven distribution, σs tends to significantly decrease, compared to that in hexagonal strontium ferrite powder not including the rare earth atom. With respect to this, the inventors have thought that, hexagonal strontium ferrite powder having the rare earth atom surface portion uneven distribution is preferable for preventing such a significant decrease in σs. In one aspect, σs of the hexagonal strontium ferrite powder according to one aspect of the invention can be equal to or greater than 45 $A \cdot m^2/kg$ and can also be equal to or greater than 47 $A \cdot m^2/kg$. On the other hand, from a viewpoint of noise reduction, σs is preferably equal to or smaller than 80 $A \cdot m^2/kg$ and more preferably equal to or smaller than 60 $A \cdot m^2/kg$. σs can be measured by using a well-known measurement device capable of measuring magnetic properties such as an oscillation sample type magnetic-flux meter.

Manufacturing Method

The hexagonal strontium ferrite powder according to one aspect of the invention described above can be manufactured by a well-known manufacturing method as a manufacturing method of hexagonal ferrite, for example, a glass crystallization method, a coprecipitation method, a reverse micelle method, or a hydrothermal synthesis method. Hereinafter, a manufacturing method using a glass crystallization method will be described as a specific aspect. However, the hexagonal strontium ferrite powder according to one aspect of the invention can be manufactured by a method other than the glass crystallization method. As an example, for example, the hexagonal strontium ferrite powder according to one aspect of the invention can also be manufactured by a hydrothermal synthesis method. The hydrothermal synthesis method is a method of heating an aqueous solution including a hexagonal strontium ferrite precursor to convert the hexagonal strontium ferrite precursor into hexagonal strontium ferrite powder. Particularly, from a viewpoint of ease of manufacturing of the atomized hexagonal strontium ferrite precursor, a continuous hydrothermal synthesis method of heating and pressurizing an aqueous fluid including a hexagonal strontium ferrite precursor while sending the aqueous fluid to a reaction flow path to convert the hexagonal strontium ferrite precursor into hexagonal strontium ferrite powder by using high reactivity of the heated and pressurized water, preferably water in a subcritical to supercritical state.

Manufacturing Method Using Glass Crystallization Method

The glass crystallization method generally includes the following steps.

(1) Step of melting a raw material mixture at least including a hexagonal strontium ferrite formation component and a glass formation component to obtain a molten material (melting step);

(2) Step of rapidly cooling the molten material to obtain an amorphous material (non-crystallization step);

(3) Step of heating the amorphous material and obtaining a crystalline material including hexagonal strontium ferrite particles and crystallized glass component precipitated by the heating (crystallization step); and (4) Step of collecting the hexagonal strontium ferrite particles from the crystalline material (particle collecting step).

Hereinafter, the step will be described later more specifically.

Melting Step

The raw material mixture used in the glass crystallization method for obtaining the hexagonal strontium ferrite powder includes the hexagonal strontium ferrite formation component and the glass formation component. The glass formation component here is a component which may show a glass transition phenomenon and may be subjected to non-crystallization (vitrification), and in a general glass crystallization method, a $B_2O_3$ component is used. Even in a case of using the glass crystallization method for obtaining the hexagonal strontium ferrite powder according to one aspect of the invention, a raw material mixture including a $B_2O_3$ component as the glass formation component, can be used. Each component included in the raw material mixture in the glass crystallization method is present as oxide or as various salt which may change into oxide during the step such as melting. The "$B_2O_3$ component" in the invention and the specification include $B_2O_3$ as it is, and various salts such as $H_3BO_3$ which may change to $B_2O_3$ during the step. The same applies to other components.

As the hexagonal strontium ferrite formation component included in the raw material mixture, oxide including an atom which is a constituting atom of the crystal structure of strontium ferrite can be used. As specific examples, $Fe_2O_3$, SrO, and the like are used.

In addition, for example, in order to obtain hexagonal strontium ferrite powder including Al, an $Al_2O_3$ component can be used, in order to obtain hexagonal strontium ferrite powder including Ba, a BaO component can be used, and in order to obtain hexagonal strontium ferrite powder including Ca, a raw material mixture including CaO component can be used.

A content of each component in the raw material mixture may be determined according to the composition of the hexagonal strontium ferrite powder to be obtained and is not particularly limited. The raw material mixture can be prepared by weighing and mixing various components. Then, the raw material mixture is melted and a molten material is obtained. A melting temperature may be set according to the composition of the raw material mixture, and is generally 1,000° C. to 1,500° C. A melting time may be suitably set so that the raw material mixture is sufficiently melted.

Non-Crystallization Step

Next, the obtained molten material is rapidly cooled to obtain an amorphous material. The rapid cooling can be performed in the same manner as in a rapid cooling generally performed for obtaining an amorphous material in the glass crystallization method, and the rapid cooling step can be performed, for example, by a well-known method such as a method of pouring the molten material on a rapidly rotated water-cooled twin roller and performing rolling and rapid cooling.

Crystallization Step

After the rapid cooling, the obtained amorphous material is heated. By the heating, the hexagonal strontium ferrite particles and crystallized glass component can be precipitated. A particle size of the precipitated hexagonal strontium ferrite particles can be controlled depending on heating conditions. An increase in heating temperature (crystallization temperature) for crystallization causes an increase in particle size of the hexagonal strontium ferrite particles to be precipitated. In addition, it is thought that an increase in crystallization temperature causes diffusion of the rare earth atom from the surface portion of the particles into the particles, thereby making the state of the rare earth atom present in the particles uniform. By considering the above point, from a viewpoint of ease of manufacturing the atomized hexagonal strontium ferrite powder having a rare earth atom surface portion uneven distribution and an activation volume of 800 to 1,500 $nm^3$, the crystallization temperature is preferably 600° C. to 660° C. and more preferably 600° C. to 650° C. In addition, the heating time for crystallization (holding time at the crystallization temperature) is, for example, 0.1 to 24 hours and preferably 0.15 to 8 hours. Further, a rate of temperature increase until the temperature achieves the crystallization temperature is preferably 1.0 to 10.0° C./min, more preferably 1.5 to 7.0° C./min, and even more preferably 2.0 to 5.0° C./min.

Particle Collecting Step

The crystalline material obtained by heating the amorphous material includes the hexagonal strontium ferrite particles and the crystallized glass component. Therefore, in a case of performing acid treatment with respect to the crystalline material, the crystallized glass component surrounding the hexagonal strontium ferrite particles is dissolved and removed, thereby collecting the hexagonal strontium ferrite particles. Before the acid treatment, it is preferable to perform a crushing process for increasing efficiency of the acid treatment. Coarse crushing may be performed by a dry or wet method. The crushing process conditions can be set according to a well-known method. The acid treatment for collecting particles can be performed by a method generally performed in the glass crystallization method such as acid treatment after heating. After that, by performing post-treatment such as water washing or drying, if necessary, the hexagonal strontium ferrite particles can be obtained.

Hereinabove, the manufacturing method of the hexagonal strontium ferrite powder according to one aspect of the invention has been described. However, the hexagonal strontium ferrite powder according to one aspect of the invention is not limited to hexagonal strontium ferrite powder manufactured by the specific aspect.

Magnetic Recording Medium

One aspect of the invention relates to a magnetic recording medium including a non-magnetic support; and a magnetic layer including the hexagonal strontium ferrite powder according to one aspect of the invention and a binding agent on the non-magnetic support.

Hereinafter, the magnetic recording medium will be described more specifically.

Magnetic Layer

Ferromagnetic Powder

The details of the ferromagnetic powder (hexagonal strontium ferrite powder) included in the magnetic layer of the magnetic recording medium are as described above.

The content (filling percentage) of the ferromagnetic powder in the magnetic layer is preferably 50% to 90% by mass and more preferably 60% to 90% by mass. The components other than the ferromagnetic powder in the magnetic layer are at least a binding agent and one or more kinds of additives may be randomly included. A high filling percentage of the ferromagnetic powder in the magnetic layer is preferable from a viewpoint of improvement recording density.

Binding Agent

The magnetic layer includes a binding agent together with the hexagonal strontium ferrite powder. As the binding agent, one or more kinds of resin is used. The resin may be a homopolymer or a copolymer. As the binding agent included in the magnetic layer, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins can be used as the binding agent even in a non-magnetic layer and/or a back coating layer which will be described later. For the binding agent described above, description disclosed in paragraphs 0029 to 0031 of JP2010-24113A can be referred to. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC). As the measurement conditions, the following conditions can be used. The weight-average molecular weight shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

Additives

Additives can be randomly added to the magnetic layer, if necessary. As various additives, a commercially available product can be suitably selected according to the desired properties or an additive can be manufactured by a well-known method and an arbitrary amount thereof can be used. Examples of the additive include an abrasive, a lubricant, a dispersing agent, a dispersing assistant, an antibacterial agent, an antistatic agent, an antioxidant, and carbon black. In addition, a curing agent can also be added to a magnetic layer forming composition. At least a part of the curing agent is included in the magnetic layer in a state of being reacted (crosslinked) with other components such as the binding agent, by proceeding the curing reaction in a manufacturing step of a magnetic recording medium. The preferred curing agent is polyisocyanate. The amount of the curing agent used can be, for example, 0 to 80.0 parts by mass with respect to 100.0 parts by mass of the binding agent in the magnetic layer forming composition, and is preferably 50.0 to 80.0 parts by mass, from a viewpoint of improvement of hardness of the magnetic layer.

Non-Magnetic Layer

Next, the details regarding the non-magnetic layer will be described. The magnetic recording medium may include a magnetic layer directly on a non-magnetic support, or may include a non-magnetic layer including non-magnetic powder and a binding agent between the non-magnetic support and the magnetic layer. The non-magnetic powder used in the non-magnetic layer may be inorganic powder or organic powder. In addition, carbon black and the like can be used. Examples of the inorganic powder include powder of metal, metal oxide, metal carbonate, metal sulfate, metal nitride, metal carbide, and metal sulfide. These non-magnetic powder can be purchased as a commercially available product or can be manufactured by a well-known method. For details of the non-magnetic powder, description disclosed in paragraphs 0036 to 0039 of JP2010-24113A can be referred to. The content (filling percentage) of the non-magnetic powder of the non-magnetic layer is preferably 50% to 90% by mass and more preferably 60% to 90% by mass.

In regards to a binding agent, a lubricant, a dispersing agent, and an additive of the non-magnetic layer, a solvent used in a non-magnetic layer forming composition, a dispersion method for preparing the non-magnetic layer forming composition, and the like, well-known technologies regarding the magnetic layer and/or the non-magnetic layer can be applied. In addition, carbon black and/or organic powder can also be added to the non-magnetic layer. For details thereof, description disclosed in paragraphs 0040 to 0042 of JP2010-24113A can be referred to, for example.

Non-Magnetic Support

As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heat treatment may be performed with respect to these supports in advance.

Thicknesses of Non-Magnetic Support and Each Layer

Regarding thicknesses of the non-magnetic support and each layer, a thickness of the non-magnetic support is, for example, 3.0 to 80.0 μm, preferably 3.0 to 20.0 μm and more preferably 3.0 to 10.0 μm. A thickness of the magnetic layer can be optimized according to a saturation magnetization amount of a magnetic head used, a head gap length, a recording signal band, and the like. The thickness of the magnetic layer is generally 10 to 150 nm, preferably 20 to 120 nm and more preferably 30 to 100 nm, from a viewpoint of realization of high-density recording. The magnetic layer may be at least one layer, or the magnetic layer can be separated to two or more layers having magnetic properties, and a configuration regarding a well-known multilayered magnetic layer can be applied. In a case of the multilayered magnetic layer, the thickness of the magnetic layer is a total thickness of the plurality of magnetic layers.

A thickness of the non-magnetic layer is, for example, 0.05 to 3.0 μm, preferably 0.05 to 2.0 μm, and even more preferably 0.05 to 1.5 μm. In the invention and the specification, the non-magnetic layer of the magnetic recording medium also includes a substantially non-magnetic layer including a small amount of ferromagnetic powder, for example, as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

The thicknesses of each layer and the non-magnetic support of the magnetic recording medium can be acquired by a well-known film thickness measurement method. As an example, a cross section of the magnetic recording medium in a thickness direction is, for example, exposed by a well-known method of ion beams or microtome, and the exposed cross section is observed with a scanning electron microscope. In the cross section observation, various thicknesses can be acquired as a thickness acquired at one portion of the cross section in the thickness direction, or an arithmetical mean of thicknesses acquired at a plurality of portions of two or more portions, for example, two portions which are randomly extracted. In addition, the thickness of each layer may be determined as a designed thickness calculated according to the manufacturing conditions.

Back Coating Layer

The magnetic recording medium can also include a back coating layer including non-magnetic powder and a binding agent on a surface side of the non-magnetic support opposite to the surface side provided with the magnetic layer. The back coating layer preferably includes carbon black and/or inorganic powder as the non-magnetic powder. In regards to the binding agent and various additives for forming the back coating layer, well-known technologies regarding the magnetic layer, the non-magnetic layer, and the back coating layer can be applied. A thickness of the back coating layer is preferably equal to or smaller than 0.9 μm and more preferably 0.1 to 0.7 μm.

Manufacturing Method of Magnetic Recording Medium

A step of manufacturing a composition for forming the magnetic layer, the non-magnetic layer, or the back coating layer generally includes at least a kneading step, a dispersing step, and a mixing step which is provided before or after these steps, if necessary. Each step may be divided into two or more stages. Various components may be added at an initial stage or in a middle stage of each step. In addition, each component may be separately added in two or more steps. In order to manufacture the magnetic recording medium, a well-known manufacturing technology of the related art can be used in a part of the step or in the entire step. For example, in the kneading step, an open kneader, a continuous kneader, a pressure kneader, or a kneader having a strong kneading force such as an extruder is preferably used. For the details of these kneading processes, descriptions disclosed in JP1989-106338A (JP-H01-106338A) and JP1989-79274A (JP-H01-79274A) can be referred to. In order to disperse the composition for forming each layer, glass beads can be used as dispersion beads. As the dispersion beads, zirconia beads, titania beads, and steel beads which are dispersion beads having high specific gravity are suitable. These dispersion beads are preferably used by optimizing a particle diameter (bead diameter) and a filling percentage of these dispersion beads. As a dispersing machine, a well-known dispersing machine can be used. Each layer forming composition may be filtered by a well-known method before performing the coating step. The filtering can be performed by using a filter, for example. As the filter used in the filtering, a filter having a hole diameter of 0.01 to 3 μm can be used, for example.

For the details of the manufacturing method of the magnetic recording medium, description disclosed in paragraphs 0051 to 0057 of JP2010-24113A can also be referred to.

The magnetic recording medium according to one aspect of the invention described above can be a tape-shaped magnetic recording medium (magnetic tape) in one aspect, and can be a disk-shaped magnetic recording medium (magnetic disk) in another aspect. The magnetic recording medium includes the hexagonal strontium ferrite powder according to one aspect of the invention in the magnetic layer, and thus, it is possible to prevent a decrease in reproducing output, even in a case where information recorded on the magnetic layer is repeatedly reproduced. The magnetic recording medium can be suitably used in a contact sliding type magnetic recording and reproducing system in which a surface of the magnetic layer and a magnetic head come into contact with each other and slide thereon, in a case of performing recording and/or reproducing of information.

EXAMPLES

Hereinafter, the invention will be described with reference to examples more specifically. However, the invention is not limited to aspects shown in the examples. "Parts" and "%" in the following description indicate "parts by mass" and "% by mass". In addition, steps and evaluations described below are performed in an atmosphere at 23° C.±1° C., unless otherwise noted.

1. Preparation and Evaluation of Hexagonal Strontium Ferrite Powder (1) Preparation and Hexagonal Strontium Ferrite Powder Example 1

1,707 g of $SrCO_3$, 687 g of $H_3BO_3$, 1,120 g of $Fe_2O_3$, 45 g of $Al(OH)_3$, 24 g of $BaCO_3$, 13 g of $CaCO_3$, and 235 g of $Nd_2O_3$ were weighed and mixed with a mixer to obtain a raw material mixture.

The obtained raw material mixture was melted in a platinum crucible at a melting temperature of 1,390° C., a tap hole provided on the bottom of the platinum crucible was heated while stirring the melted liquid, and the melted liquid was extracted in a rod shape at approximately 6 g/sec. The extracted liquid was rolled and rapidly cooled with a water-cooled twin roller to manufacture an amorphous material.

280 g of the manufactured amorphous material was put into an electric furnace and heated to 635° C. (crystallization temperature) at a rate of temperature increase of 3.5° C./min, and held at the same temperature for 5 hours, to precipitate (crystallize) hexagonal strontium ferrite particles.

Then, a crystalline material obtained above including the hexagonal strontium ferrite particles was coarsely crushed with a mortar and subjected to a dispersion process with a paint shaker for 3 hours, by adding 1,000 g of zirconia beads having a particle diameter of 1 mm and 800 ml of acetic acid having a concentration of 1% in a glass bottle. After that, the obtained dispersion liquid was separated from the beads and put into a stainless steel beaker. A dissolving process of the glass component was performed by leaving the dispersion liquid at a liquid temperature of 100° C. for 3 hours, the precipitation was performed with a centrifugal separator, decantation was repeated for washing, and the resultant material was dried in a heating furnace at a temperature in the furnace of 110° C. for 6 hours, thereby obtaining hexagonal strontium ferrite powder.

Example 2

Hexagonal strontium ferrite powder was obtained in the same manner as in Example 1, except that the amount $Nd_2O_3$ used in the preparation of the raw material mixture was set as 47 g.

Example 3

Hexagonal strontium ferrite powder was obtained in the same manner as in Example 1, except that the amount $Nd_2O_3$ used in the preparation of the raw material mixture was set as 142 g.

Example 4

Hexagonal strontium ferrite powder was obtained in the same manner as in Example 1, except that the amount $Nd_2O_3$ used in the preparation of the raw material mixture was set as 282 g.

Example 5

Hexagonal strontium ferrite powder was obtained in the same manner as in Example 1, except that the amount $Nd_2O_3$ used in the preparation of the raw material mixture was set as 353 g.

Example 6

Hexagonal strontium ferrite powder was obtained in the same manner as in Example 1, except that the crystallization temperature was changed to 630° C.

Example 7

Hexagonal strontium ferrite powder was obtained in the same manner as in Example 1, except that the crystallization temperature was changed to 640° C.

Example 8

Hexagonal strontium ferrite powder was obtained in the same manner as in Example 1, except that the crystallization temperature was changed to 645° C.

Example 9

Hexagonal strontium ferrite powder was obtained in the same manner as in Example 1, except that 251 g of $Sm_2O_3$ was added in the preparation of the raw material mixture, instead of $Nd_2O_3$.

Example 10

Hexagonal strontium ferrite powder was obtained in the same manner as in Example 1, except that 163 g of $Y_2O_3$ was added in the preparation of the raw material mixture, instead of $Nd_2O_3$.

Example 11

Hexagonal strontium ferrite powder was obtained in the same manner as in Example 1, except that 265 g of $Dy_2O_3$ was added in the preparation of the raw material mixture, instead of $Nd_2O_3$.

Example 12

Hexagonal strontium ferrite powder was obtained in the same manner as in Example 1, except that 1,707 g of $SrCO_3$, 697 g of $H_3BO_3$, 1,090 g of $Fe_2O_3$, and 229 g of $Nd_2O_3$ were weighed in the preparation of the raw material mixture, and the raw material mixture was obtained by mixing the components with each other.

Comparative Example 1

Hexagonal strontium ferrite powder was obtained in the same manner as in Example 1, except that $Nd_2O_3$ was not added in the preparation of the raw material mixture and the crystallization temperature was changed to 630° C.

Comparative Example 2

Hexagonal strontium ferrite powder was obtained in the same manner as in Example 1, except that the amount of $Nd_2O_3$ used in the preparation of the raw material mixture was set as 471 g.

Comparative Example 3

Hexagonal strontium ferrite powder was obtained in the same manner as in Example 1, except that the amount of $Nd_2O_3$ used in the preparation of the raw material mixture was set as 95 g the crystallization temperature was changed to 675° C., and the holding time was changed to 10 hours.

Reference Example 1

Hexagonal strontium ferrite powder was obtained in the same manner as in Example 1, except that the amount of $Nd_2O_3$ used in the preparation of the raw material mixture was set as 140 g, the crystallization temperature was changed to 710° C., and the holding time at the same temperature was changed 2 hours.

(2) Evaluation of Hexagonal Strontium Ferrite Powder (X-Ray Diffraction Analysis)

Sample powder was collected from the powder obtained in the examples and the comparative examples, and the X-ray diffraction analysis was performed. As a result of analysis, all of the powder obtained in the examples and the comparative examples showed a crystal structure of magnetoplumbite type (M type) hexagonal ferrite. In addition, a crystal phase detected by the X-ray diffraction analysis was a magnetoplumbite type single phase. The X-ray diffraction analysis was performed by scanning with a CuKα ray at a voltage of 45 kV and intensity of 40 mA and by measuring X-ray diffraction pattern under the conditions.

PANalytical X'Pert Pro diffractometer, PIXcel detector
Soller slit of incident beam and diffraction beam: 0.017 radians
Fixed angle of dispersion slit: ¼ degrees
Mask: 10 mm
Scattering prevention slit: ¼ degrees
Measurement mode: continuous
Measurement time per 1 stage: 3 seconds
Measurement speed: 0.017 degrees per second
Measurement step: 0.05 degrees
Surface Portion Content, Bulk Content, and Surface Portion Content/Bulk Content of Rare Earth Atom 12 mg of sample powder was collected from each hexagonal strontium ferrite powder of the examples and the comparative examples, element analysis of filtrate obtained by partially dissolving the sample powder under the dissolving conditions described above was performed by the ICP analysis device, and the surface portion content of the rare earth atom was obtained.

Separately, 12 mg of sample powder was collected from each hexagonal strontium ferrite powder obtained in the examples and the comparative examples, element analysis of filtrate obtained by totally dissolving the sample powder under the dissolving conditions described above was performed by the ICP analysis device, and the surface portion content of the rare earth atom was obtained.

From the obtained values, the "surface portion content/bulk content" was calculated.

It is thought that a reason for that the hexagonal strontium ferrite powder of Comparative Example 3 did not have a rare earth atom surface portion uneven distribution is because the rare earth atom unevenly distributed in the surface portion was diffused inside in the crystallization step.

Activation Volume and Anisotropy Constant Ku

Sample powder was collected from each hexagonal strontium ferrite powder of the examples and the comparative examples, and the activation volume and the anisotropy constant Ku were obtained by the method described above by using an oscillation sample type magnetic-flux meter (manufactured by Toei Industry Co., Ltd.).

Mass Magnetization σs

The mass magnetization σs of each hexagonal strontium ferrite powder of the examples and the comparative examples was measured at a magnetic field strength of 1,194 kA/m (15 kOe) by using an oscillation sample type magnetic-flux meter (manufactured by Toei Industry Co., Ltd.).

2. Manufacturing and Evaluation of Magnetic Recording Medium (Magnetic Tape)

(1) Manufacturing of Magnetic Recording Medium (Magnetic Tape)

A magnetic tape was manufactured by the following method by using each hexagonal strontium ferrite powder of the examples and the comparative examples. Hereinafter, the magnetic tape manufactured by using the hexagonal strontium ferrite powder of Example 1 is referred to as a magnetic tape of Example 1. The same applies to the other examples and comparative examples.

List of Magnetic Layer Forming Composition
hexagonal strontium ferrite powder of the examples and the comparative examples: 100.0 parts
Polyurethane resin: 12.2 parts
  Weight-average molecular weight: 10,000
  Sulfonic acid group content: 0.5 meq/g
Diamond particles: 1.85 parts
  Average particle size: 50 nm
Carbon black (#55 manufactured by Asahi Carbon Co., Ltd.): 0.5 parts
  Average particle size: 0.015 μm
Stearic acid: 0.5 parts
Butyl stearate: 2.1 parts
Methyl ethyl ketone: 180.0 parts Cyclohexanone: 100.0 parts
List of Non-Magnetic Layer Forming Composition
Non-magnetic powder α-iron oxide: 103.0 parts
  Average particle size: 0.09 μm
  BET (Brunauer-Emmett-Teller) specific surface area: 50 m$^2$/g
  pH: 7
  Dibutyl phthalate (DBP) oil absorption amount: 27 to 38 g/100 g
  Surfactant: $Al_2O_3$ (8% by mass)
Carbon black (CONDUCTEX TEX SC-U manufactured by Columbia Carbon): 25.0 parts
A vinyl chloride copolymer (MR 104 manufactured by Zeon Corporation): 12.9 parts
A polyurethane resin (UR8200 manufactured by Toyobo Co., Ltd.): 5.2 parts
Phenylphosphonic acid: 3.5 parts
Butyl stearate: 1.1 parts
Stearic acid: 2.1 parts
Methyl ethyl ketone: 205.0 parts
Cyclohexanone: 135.0 parts List of Back Coating Layer Forming Composition
Non-magnetic powder α-iron oxide: 80.0 parts
  Average particle size: 0.15 μm
  Average acicular ratio: 7
  BET specific surface area: 52 m2/g
Carbon black: 20.0 parts
  Average particle size: 20 nm
A vinyl chloride copolymer: 13.0 parts
A sulfonic acid group-containing polyurethane resin: 6.0 parts
Phenylphosphonic acid: 3.0 parts
Cyclohexanone: 155.0 parts
Methyl ethyl ketone: 155.0 parts
Stearic acid: 3.0 parts
Butyl stearate: 3.0 parts
Polyisocyanate: 5.0 parts
Cyclohexanone: 200.0 parts Manufacturing of Magnetic Tape Regarding each of the magnetic layer forming composition and the non-magnetic layer forming composition, each component was kneaded with a kneader. The component was transferred to a transverse sand mill containing zirconia beads having a bead diameter of 1.0 mm by the filling amount which is 65 volume % with respect to a volume of a dispersion portion, and dispersed at 2,000 revolution per minutes (rpm) for 120 minutes (time for which the component is substantially held in the dispersion portion). Regarding the magnetic layer forming composition, the obtained dispersion liquid was filtered by using a filter having a hole diameter of 1 μm, thereby obtaining the magnetic layer forming composition. Regarding the non-magnetic layer forming composition, 6.5 parts of polyisocyanate and 7.0 parts of methyl ethyl ketone were added to the dispersion liquid obtained by the dispersion and filtered by using a filter having a hole diameter of 1 μm, thereby obtaining the magnetic layer forming composition.

A back coating layer forming composition was prepared by the following method. The components excluding the lubricant (stearic acid and butyl stearate), polyisocyanate, and 200.0 parts of cyclohexanone were kneaded by an open kneader and diluted, and was subjected to a dispersion process of 12 passes, with a transverse beads mill disperser and zirconia beads having a bead diameter of 1.0 mm, by setting a bead filling percentage as 80 volume %, a circumferential speed of rotor distal end as 10 m/sec, and a retention time for 1 pass as 2 minutes. After that, the remaining components were added to the dispersion liquid and stirred with a dissolver. The obtained dispersion liquid was filtered with a filter having an average hole diameter of 1.0 μm and the back coating layer forming composition was obtained.

After that, the non-magnetic layer forming composition was applied onto one surface of a non-magnetic support made of polyethylene naphthalate having a thickness of 5.0 μm so that a thickness after the drying becomes 0.1 μm and was dried, and then, the non-magnetic layer was formed.

Then, the magnetic layer forming composition was applied onto the non-magnetic layer so that a thickness after the drying becomes 70 nm, and a coating layer was formed. A homeotropic alignment process was performed by applying a magnetic field having a magnetic field strength of 0.6 T in a vertical direction with respect to a surface of the coating layer, while the coating layer is wet, and then, the coating surface was dried to form a magnetic layer.

After that, the back coating layer forming composition was applied to the opposite surface of the non-magnetic support so that a thickness after the drying becomes 0.4 μm and was dried, thereby forming the back coating layer.

Then, a surface smoothing treatment (calendar process) was performed by a calendar configured of only a metal roll, at a surface temperature of a calendar roll of 90° C. and linear pressure of 300 kg/cm (294 kN/m). After that, slitting was performed to have a width of ½ inches (0.0127 meters), and surface polishing treatment was performed, thereby obtaining a magnetic tape.

(2) Evaluation of Magnetic Recording Medium (Magnetic Tape)

Decrease in Reproducing Output During Repeated Reproducing (Decay Rate of Reproducing Output)

A recording head metal-in-gap (MIG) (gap length of 0.15 μm, 1.8 T) and a giant magnetoresistive (GMR) head for reproducing (reproducing track width of 1 μm) were attached to a loop tester, a signal having a linear recording density of 200 kfci was recorded on each magnetic tape of the examples and the comparative examples, the recording signal was repeatedly reproduced, and the decay rate of reproducing output with respect to time from the recording to the reproducing was measured. The decay rate of reproducing output measured as described above is a numerical value (unit: %/decade) equal to or smaller than 0, and a great absolute value means a significant decrease in reproducing output during repeated reproducing. The decay rate of reproducing output which is smaller than the detection lower limit (−0.5%/decade) is shown as ">−0.5%" in Table 1.

Running Durability

Each magnetic tape (length of 100 m) of the examples and the comparative examples was caused to run for 1,000 passes in a linear tester at a running speed of 3 m/sec, the surface of the magnetic layer and the magnetic head were brought into contact with each other and slid thereon. After the running, the state of the surface of the magnetic layer was observed at portions of 20 m, 40 m, 60 m, and 80 m from the end of the magnetic tape in a longitudinal direction of the magnetic tape with an optical microscope (EclipseLV 150 manufactured by Nikon Corporation, observation magnification: 50 times), and running durability was evaluated based on the following evaluation standard.

Evaluation Standard

5: Sliding mark is not observed.

4: light sliding mark is observed, but has not been developed into chipping of the surface of the magnetic layer.

3: surface of the magnetic layer is chipped off, but the portion where the surface of the magnetic layer is peeled off or the magnetic layer was scraped was not observed.

2: surface of the magnetic layer is chipped off, and a large number of portions where the surface of the magnetic layer is peeled off or the magnetic layer was scraped were obtained.

1: the entire surface of the magnetic layer is scraped.

The results of the above evaluation are shown in Table 1.

TABLE 1

| | Rare earth atom | | | | | | | | |
|---|---|---|---|---|---|---|---|---|---|
| | Kind | Surface portion content/ bulk content | Surface portion content (with respect to 100 atom % of Fe atom) | Bulk content (with respect to 100 atom % of Fe atom) | Uneven distribution of rare earth atom in surface portion | Activation volume ($nm^3$) | Anisotropy constant Ku ($\times 10^6$ erg/cc) | σs (A·$m^2$/kg) | Reproducing output decay rate (%/decade) | Running durability |
| Example 1 | Nd | 2.8 | 8.0 | 2.9 | Observed | 902 | 2.2 | 49 | >−0.5 | 5 |
| Example 2 | Nd | 3.1 | 1.8 | 0.6 | Observed | 950 | 2.1 | 51 | >−0.5 | 4 |
| Example 3 | Nd | 2.9 | 5.0 | 1.7 | Observed | 922 | 2.2 | 50 | >−0.5 | 5 |
| Example 4 | Nd | 3.1 | 10.6 | 3.4 | Observed | 897 | 2.2 | 48 | >−0.5 | 5 |
| Example 5 | Nd | 3.2 | 13.7 | 4.3 | Observed | 895 | 2.2 | 47 | >−0.5 | 5 |
| Example 6 | Nd | 3.3 | 8.9 | 2.7 | Observed | 879 | 2.2 | 49 | −0.9 | 4 |
| Example 7 | Nd | 2.4 | 7.2 | 3.0 | Observed | 943 | 2.3 | 48 | −0.7 | 5 |
| Example 8 | Nd | 2.2 | 6.8 | 3.1 | Observed | 1007 | 2.3 | 47 | >−0.5 | 5 |
| Example 9 | Sm | 2.1 | 7.1 | 3.4 | Observed | 953 | 2.0 | 49 | −0.8 | 5 |
| Example 10 | Y | 2.4 | 8.6 | 3.6 | Observed | 965 | 2.0 | 49 | −0.7 | 5 |
| Example 11 | Dy | 1.9 | 5.1 | 2.7 | Observed | 1013 | 2.0 | 49 | −0.6 | 5 |
| Example 12 | Nd | 2.9 | 9.0 | 3.1 | Observed | 978 | 2.0 | 49 | −0.7 | 5 |
| Comparative Example 1 | None | — | — | — | — | 1194 | 1.8 | 50 | −2.4 | 3 |
| Comparative Example 2 | Nd | 3.4 | 19.4 | 5.7 | Observed | 961 | 1.9 | 41 | −2.1 | 3 |
| Comparative Example 3 | Nd | 1.0 | 3.2 | 3.2 | Not observed | 1464 | 1.8 | 39 | −1.5 | 3 |
| Reference Example 1 | Nd | 2.8 | 4.2 | 1.5 | Observed | 1564 | 1.9 | 41 | >−0.5 | 3 |

The following points can be confirmed from the results shown in Table 1.

(1) With the comparison of Reference Example 1 and Comparative Examples 1 to 3, it is possible to confirm that a decrease in reproducing output during repeated reproducing significantly occurs, in the hexagonal strontium ferrite powder having an activation volume of 800 to 1,500 $nm^3$ (Comparative Examples 1 to 3), compared to the hexagonal strontium ferrite powder having an activation volume greater than 1,500 $nm^3$ (Reference Example 1).

(2) With the comparison of Examples 1 to 12 and Comparative Examples 1 to 3, it is possible to confirm that a significant decrease in reproducing output can be prevented by allowing the hexagonal strontium ferrite powder having an activation volume of 800 to 1,500 $nm^3$ to include a rare earth atom with a content of 0.5 to 5.0 atom % with respect to 100 atom % of iron atom and to have a rare earth atom surface portion uneven distribution (Examples 1 to 12).

(3) It is possible to confirm that the magnetic tapes of Examples 1 to 12 have excellent running durability, compared to the magnetic tapes of Comparative Examples 1 to 3 and Reference Example 1.

(4) It is possible to confirm that each hexagonal strontium ferrite powder of Examples 1 to 12 shows σs which is slightly different from or the same as that of the hexagonal strontium ferrite powder of Comparative Example 1 which does not include a rare earth atom, compared to the hexagonal strontium ferrite powders of Comparative Example 2 and Comparative Example 3.

The invention is useful in the technical field of a magnetic recording medium for high-density recording.

What is claimed is:

1. Hexagonal strontium ferrite powder,
wherein the activation volume of the hexagonal strontium ferrite powder is 800 to 1,500 nm$^3$,
the bulk content of rare earth atom with respect to 100 atom % of iron atom of the hexagonal strontium ferrite powder is 0.5 to 5.0 atom %,
the hexagonal strontium ferrite powder is hexagonal strontium ferrite powder for magnetic recording, and has a rare earth atom surface portion uneven distribution, and
the following ratio, namely, the surface portion content of the rare earth atom/the bulk content of the rare earth atom, of the hexagonal strontium ferrite powder is greater than 1.0, where:
the surface portion content of the rare earth atom is a rare earth atom content with respect to 100 atom % of iron atom in a solution obtained by partially dissolving the hexagonal strontium ferrite powder with acid under the following partial dissolving condition, and
the bulk content of the rare earth atom is a rare earth atom content with respect to 100 atom % of iron atom in a solution obtained by totally dissolving the hexagonal strontium ferrite powder with acid under the following total dissolving condition:
partial dissolving condition: a vessel containing 12 mg of the hexagonal strontium ferrite powder and 10 ml of hydrochloric acid having a concentration of 1 mol/L is held on a hot plate at a set temperature of 70° C. for 1 hour; and
total dissolving condition: a vessel containing 12 mg of the hexagonal strontium ferrite powder and 10 ml of hydrochloric acid having a concentration of 4 mol/L is held on a hot plate at a set temperature of 80° C. for 3 hours.

2. The hexagonal strontium ferrite powder for magnetic recording according to claim 1,
wherein the rare earth atom comprises a neodymium atom.

3. The hexagonal strontium ferrite powder for magnetic recording according to claim 1,
wherein the rare earth atom comprises a samarium atom.

4. The hexagonal strontium ferrite powder for magnetic recording according to claim 1,
wherein the rare earth atom comprises an yttrium atom.

5. The hexagonal strontium ferrite powder for magnetic recording according to claim 1,
wherein the rare earth atom comprises a dysprosium atom.

6. The hexagonal strontium ferrite powder for magnetic recording according to claim 1,
wherein the activation volume is 800 to 1,100 nm$^3$.

7. The hexagonal strontium ferrite powder for magnetic recording according to claim 1,
wherein an anisotropy constant Ku is equal to or greater than 2.0×10$^6$ erg/cc.

8. The hexagonal strontium ferrite powder for magnetic recording according to claim 1,
wherein a mass magnetization σs is equal to or greater than 45 A·m$^2$/kg.

9. A magnetic recording medium comprising:
a non-magnetic support; and
a magnetic layer including ferromagnetic powder and a binding agent on the non-magnetic support,
wherein the ferromagnetic powder is hexagonal strontium ferrite powder,
the activation volume of the hexagonal strontium ferrite powder is 800 to 1,500 nm$^3$,
the bulk content of rare earth atom with respect to 100 atom % of iron atom of the hexagonal strontium ferrite powder is 0.5 to 5.0 atom %,
the hexagonal strontium ferrite powder has a rare earth atom surface portion uneven distribution, and
the following ratio, namely, the surface portion content of the rare earth atom/the bulk content of the rare earth atom, of the hexagonal strontium ferrite powder is greater than 1.0, where:
the surface portion content of the rare earth atom is a rare earth atom content with respect to 100 atom % of iron atom in a solution obtained by partially dissolving the hexagonal strontium ferrite powder with acid under the following partial dissolving condition, and
the bulk content of the rare earth atom is a rare earth atom content with respect to 100 atom % of iron atom in a solution obtained by totally dissolving the hexagonal strontium ferrite powder with acid under the following total dissolving condition:
partial dissolving condition: a vessel containing 12 mg of the hexagonal strontium ferrite powder and 10 ml of hydrochloric acid having a concentration of 1 mol/L is held on a hot plate at a set temperature of 70° C. for 1 hour; and
total dissolving condition: a vessel containing 12 mg of the hexagonal strontium ferrite powder and 10 ml of hydrochloric acid having a concentration of 4 mol/L is held on a hot plate at a set temperature of 80° C. for 3 hours.

10. The magnetic recording medium according to claim 9, wherein the rare earth atom comprises a neodymium atom.

11. The magnetic recording medium according to claim 9, wherein the rare earth atom comprises a samarium atom.

12. The magnetic recording medium according to claim 9, wherein the rare earth atom comprises an yttrium atom.

13. The magnetic recording medium according to claim 9, wherein the rare earth atom comprises a dysprosium atom.

14. The magnetic recording medium according to claim 9, wherein the activation volume is 800 to 1,100 nm$^3$.

15. The magnetic recording medium according to claim 9, wherein an anisotropy constant Ku of the hexagonal strontium ferrite powder is equal to or greater than 2.0×10$^6$ erg/cc.

16. The magnetic recording medium according to claim 9, wherein a mass magnetization σs of the hexagonal strontium ferrite powder is equal to or greater than 45 A·m$^2$/kg.

17. The hexagonal strontium ferrite powder for magnetic recording according to claim 1,
wherein the recited ratio, namely, the surface portion content of the rare earth atom/the bulk content of the rare earth atom, of the hexagonal strontium ferrite powder is equal to or greater than 1.5.

18. The magnetic recording medium according to claim 9, wherein the recited ratio, namely, the surface portion content of the rare earth atom/the bulk content of the rare earth atom, of the hexagonal strontium ferrite powder is equal to or greater than 1.5.

19. The hexagonal strontium ferrite powder for magnetic recording according to claim 1, wherein the recited ratio, namely, the surface portion content of the rare earth atom/the bulk content of the rare earth atom, of the hexagonal strontium ferrite powder is equal to or greater than 1.9.

20. The magnetic recording medium according to claim 9, wherein the recited ratio, namely, the surface portion content of the rare earth atom/the bulk content of the rare earth atom, of the hexagonal strontium ferrite powder is equal to or greater than 1.9.

21. The hexagonal strontium ferrite powder for magnetic recording according to claim 1,
wherein the activation volume of the hexagonal strontium ferrite powder is 895 to 1,500 nm$^3$,
the bulk content of rare earth atom with respect to 100 atom % of iron atom of the hexagonal strontium ferrite powder is 1.0 to 5.0 atom %, and
the rare earth atom is a neodymium atom.

22. The magnetic recording medium according to claim 9, wherein the activation volume of the hexagonal strontium ferrite powder is 895 to 1,500 nm$^3$,
the bulk content of rare earth atom with respect to 100 atom % of iron atom of the hexagonal strontium ferrite powder is 1.0 to 5.0 atom %, and
the rare earth atom is a neodymium atom.

* * * * *